US011890764B2

(12) United States Patent
Knight et al.

(10) Patent No.: US 11,890,764 B2
(45) Date of Patent: Feb. 6, 2024

(54) DIGITAL IMAGING SYSTEMS AND METHODS OF ANALYZING PIXEL DATA OF AN IMAGE OF A USER'S BODY FOR DETERMINING A HAIR DENSITY VALUE OF A USER'S HAIR

(71) Applicant: THE GILLETTE COMPANY LLC, Boston, MA (US)

(72) Inventors: Leigh Knight, Reading (GB); Susan Clare Robinson, Windsor (GB)

(73) Assignee: THE GILLETTE COMPANY LLC, Boston, MA (US)

( * ) Notice: Subject to any disclaimer, the term of this patent is extended or adjusted under 35 U.S.C. 154(b) by 518 days.

(21) Appl. No.: 16/919,201

(22) Filed: Jul. 2, 2020

(65) Prior Publication Data
US 2022/0005177 A1 Jan. 6, 2022

(51) Int. Cl.
*G06Q 30/00* (2023.01)
*B26B 19/38* (2006.01)
(Continued)

(52) U.S. Cl.
CPC ............... *B26B 19/38* (2013.01); *G06N 5/04* (2013.01); *G06N 20/00* (2019.01);
(Continued)

(58) Field of Classification Search
CPC ....... G06T 7/0002; G06T 11/60; G06N 20/00; G06N 5/04; G06V 40/10; G06Q 30/0631
See application file for complete search history.

(56) References Cited

U.S. PATENT DOCUMENTS 5,252,331 A 10/1993 Curtis et al.
9,013,567 B2 4/2015 Clemann et al.
(Continued)

FOREIGN PATENT DOCUMENTS

CN 109376575 A 2/2019
EP 3428838 A2 1/2019
(Continued)

OTHER PUBLICATIONS

ScienceInsider: Youtube video "What Are Ingrown Hairs—And How To Treat Them", Published Jun. 2, 2018. https://_www.youtube.corn/watch?v=laevAwpnPjc<https://www.youtube.corn/watch?v=laevAwpnPjc> (Year: 2018).
(Continued)

*Primary Examiner* — Ethan D Civan
(74) *Attorney, Agent, or Firm* — MARSHALL, GERSTEIN & BORUN LLP

(57) ABSTRACT

Artificial intelligence based systems and methods are described for analyzing pixel data of an image of a user's body for determining a hair density value of the user's hair. An example method includes aggregating a plurality of training images of a plurality of users' bodies, and training a hair density model operable to output a hair density value. The example method may further include receiving an image of a user comprising pixel data of a portion of the user's body or body area, and analyzing, by the hair density model, the image to determine a user-specific hair density value of the user's hair. The example method may further include generating a product recommendation, wherein the product is designed to address a feature identifiable within the pixel data of the user's body or body area.

23 Claims, 4 Drawing Sheets

(51) Int. Cl.
  *G06N 20/00* (2019.01)
  *G06V 40/10* (2022.01)
  *G06N 5/04* (2023.01)
  *G06Q 30/0601* (2023.01)
  *G06T 7/00* (2017.01)
  *G06T 11/60* (2006.01)
  *G06V 10/764* (2022.01)

(52) U.S. Cl.
  CPC ....... *G06Q 30/0631* (2013.01); *G06T 7/0002* (2013.01); *G06T 11/60* (2013.01); *G06V 10/764* (2022.01); *G06V 40/10* (2022.01); *G06T 2207/20081* (2013.01); *G06T 2207/30196* (2013.01); *G06T 2207/30242* (2013.01)

(56) References Cited

U.S. PATENT DOCUMENTS

| | | |
|---|---|---|
| 2003/0065523 A1 | 4/2003 | Pruche et al. |
| 2003/0065636 A1 | 4/2003 | Peyrelevade |
| 2008/0228178 A1 | 9/2008 | Van Hal et al. |
| 2009/0024023 A1 | 1/2009 | Welches et al. |
| 2010/0198683 A1 | 8/2010 | Aarabi |
| 2010/0256966 A1 | 10/2010 | Cowley et al. |
| 2011/0016001 A1 | 1/2011 | Schieffelin |
| 2012/0217074 A1 | 8/2012 | Rudinec |
| 2012/0300049 A1 | 11/2012 | Clemann |
| 2012/0320180 A1 | 12/2012 | Binder |
| 2013/0021460 A1 | 1/2013 | Burdoucci |
| 2015/0230712 A1 | 8/2015 | Aarabi |
| 2016/0167241 A1 | 6/2016 | Goldfarb et al. |
| 2017/0032223 A1 | 2/2017 | Zingaretti et al. |
| 2017/0270593 A1 | 9/2017 | Sherman et al. |
| 2017/0330264 A1 | 11/2017 | Youssef et al. |
| 2018/0001497 A1 | 1/2018 | Fontecchio et al. |
| 2018/0040050 A1 | 2/2018 | Robinson et al. |
| 2018/0040053 A1* | 2/2018 | Robinson ............... G06Q 30/02 |
| 2018/0040054 A1 | 2/2018 | Robinson et al. |
| 2018/0150896 A1 | 5/2018 | Parkkinen et al. |
| 2018/0214072 A1 | 8/2018 | Zingaretti et al. |
| 2018/0247365 A1 | 8/2018 | Cook et al. |
| 2018/0349979 A1 | 12/2018 | Robinson et al. |
| 2018/0354147 A1 | 12/2018 | Goldfarb et al. |
| 2019/0166980 A1 | 6/2019 | Huang et al. |
| 2019/0209078 A1 | 7/2019 | Charraud et al. |
| 2019/0224865 A1 | 7/2019 | Robinson et al. |
| 2019/0350514 A1 | 11/2019 | Purwar |
| 2019/0355115 A1* | 11/2019 | Niebauer ............... G06N 20/00 |
| 2020/0037732 A1 | 2/2020 | Kang |
| 2020/0134672 A1 | 4/2020 | El Kaliouby et al. |
| 2020/0294234 A1* | 9/2020 | Rance ..................... G06F 18/22 |
| 2021/0260780 A1 | 8/2021 | Zafiropoulos |
| 2022/0000417 A1 | 1/2022 | Knight et al. |
| 2022/0005193 A1 | 1/2022 | Robinson et al. |
| 2022/0005194 A1 | 1/2022 | Knight et al. |
| 2022/0005195 A1 | 1/2022 | Knight et al. |
| 2022/0005218 A1 | 1/2022 | Robinson et al. |
| 2022/0057914 A1 | 2/2022 | Sauers |
| 2022/0164852 A1 | 5/2022 | Punyani et al. |

FOREIGN PATENT DOCUMENTS

| | | |
|---|---|---|
| EP | 3651949 A1 | 5/2020 |
| JP | 2015500722 A | 1/2015 |
| KR | 20190051256 A | 5/2019 |
| WO | 2011085727 A1 | 7/2011 |
| WO | WO-2011106792 A2 | 9/2011 |
| WO | 2019011523 A1 | 1/2019 |
| WO | WO-2019136354 A1 | 7/2019 |
| WO | 2019234144 A1 | 12/2019 |

OTHER PUBLICATIONS

Extended EP Search Report and Written Opinion for 21182036.0 dated Nov. 23, 2021, 09 pages.
All Office Actions; U.S. Appl. No. 16/919,220, filed Jul. 2, 2020.
All Office Actions; U.S. Appl. No. 16/919,260, filed Jul. 2, 2020.
All Office Actions; U.S. Appl. No. 16/919,279, filed Jul. 2, 2020.
All Office Actions; U.S. Appl. No. 16/919,314, filed Jul. 2, 2020.
All Office Actions; U.S. Appl. No. 16/919,243, filed Jul. 2, 2020.

* cited by examiner

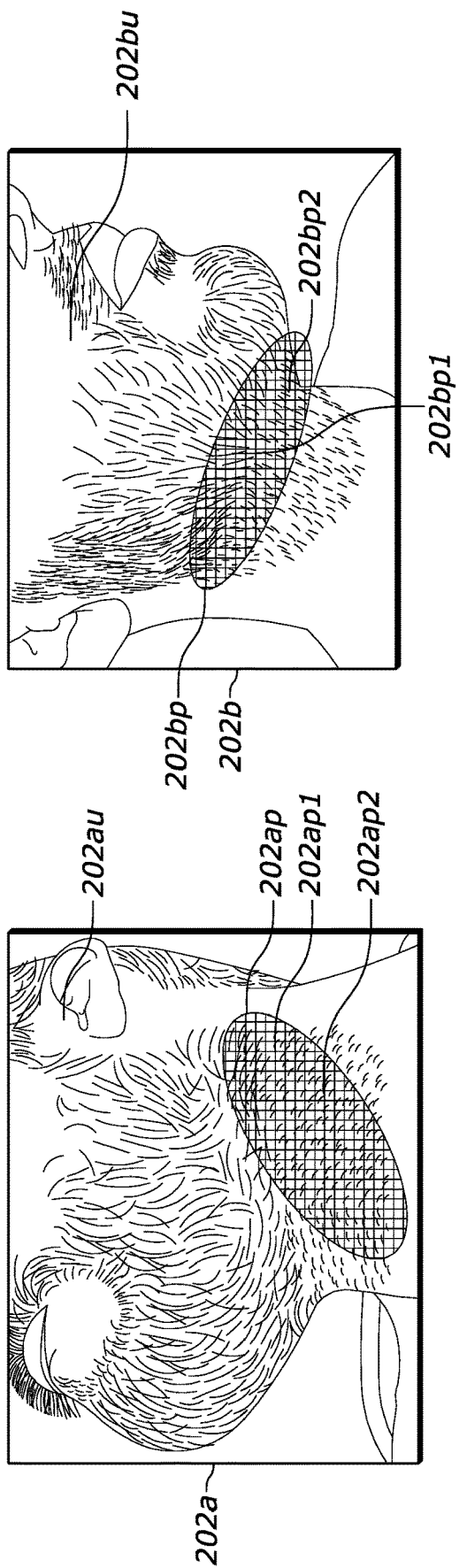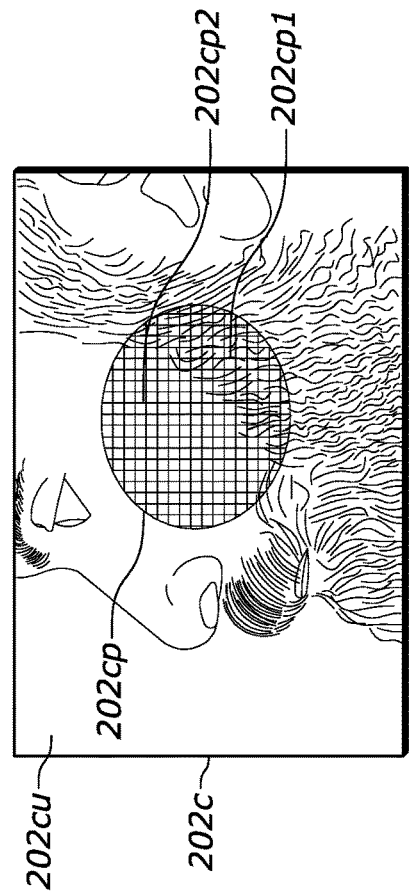

DIGITAL IMAGING SYSTEMS AND METHODS OF ANALYZING PIXEL DATA OF AN IMAGE OF A USER'S BODY FOR DETERMINING A HAIR DENSITY VALUE OF A USER'S HAIR

FIELD

The present disclosure generally relates to digital imaging systems and methods, and more particularly to, digital imaging systems and methods for analyzing pixel data of an image of a user's body for determining a hair density value of the user's hair.

BACKGROUND

Generally, shave performance can be summarized as a trade-off between closeness and irritation, where a user typically can either achieve, on the one hand, a closeness of shave (removing more hair) but at the risk of irritation, redness, or cuts of his or her skin, or, on the other hand, a less close shave (leaving more hair) but reducing the risk of skin irritation. For users with dense patches of hair, they typically perform multiple shaving strokes with an increased load or pressure applied to the razor in order to fully remove the hair in the patch, increasing the risk of skin irritation and even skin cuts. Moreover, shaving techniques and products available that reduce the chance of skin irritation or damage during shaving and improve the health of skin and hair after shaving can be crucial for such users to avoid an unpleasant shaving experience. Simply put, users with a high hair density have a similarly increased risk of skin damage throughout the shaving process.

Thus a problem arises for existing shaving razors, and the use thereof, where users with high hair density desiring a close, complete shave generally perform too many shaving strokes and apply too much pressure during a shave session, because they lack correct shaving technique or equipment. The problem is acutely pronounced given the various versions, brands, and types of shaving razors and accompanying products currently available to users. Each of the versions, brands, and types of shaving razors have different components, blades, sharpness, and/or otherwise different configurations, all of which can vary significantly in the amount of pressure or load required to achieve a close shave with little or no skin irritation or cuts. Moreover, the various versions, brands, and types of accompanying shaving products have a myriad of different intended uses, of which, any user may be uninformed.

To further compound these problems, user's often struggle when deciding on which hair style to adopt. This confusion or hesitation can stem from a lack of understanding related to their hair density in numerous areas of their body, which impacts the overall appearance/effectiveness of many popular hair styles. As a result, many users purchase incorrect or unnecessary products for their desired hair style, and/or otherwise have unpleasant shaving/trimming experiences because they fail to purchase products that would lessen skin irritation and the risk of skin cuts. This problem is particularly acute because existing shaving razors and accompanying products provide little or no feedback or guidance to assist the user in achieving certain hair styles or making prudent grooming choices without skin irritation based on their specific hair density.

For the foregoing reasons, there is a need for digital imaging systems and methods for analyzing pixel data of an image of a user's body for determining a hair density value of the user's hair.

SUMMARY

Generally, as described herein, the digital systems and methods for analyzing pixel data of an image of a user's body for determining a hair density value of the user's hair provide a digital imaging, and artificial intelligence (AI), based solution for overcoming problems that arise when determining adequate shaving products and/or technique based on a user's hair density. The digital systems and methods allow a user to submit a specific user image to imaging server(s) (e.g., including its one or more processors), or otherwise a computing device (e.g., such as locally on the user's mobile device), where the imaging server(s) or user computing device implements or executes a hair density model trained with pixel data of potentially 10,000s (or more) images of users with varying hair densities. The hair density model may generate, based on a determined user-specific hair density value, at least one product recommendation for a manufactured product designed to address at least one feature identifiable within the pixel data of the user's body or body area. For example, the at least one feature can comprise pixels or pixel data indicative of a high hair density value in a concentrated region of the user's skin. In some embodiments, the at least one product recommendation may be rendered, on a display screen of a user computing device. In other embodiments, no transmission to the imaging server of the user's specific image occurs, where the product recommendation may instead be generated by the hair density model, executing and/or implemented locally on the user's mobile device and rendered, by a processor of the mobile device, on a display screen of the mobile device. In various embodiments, such rendering may include graphical representations, overlays, annotations, and the like for addressing the feature in the pixel data.

More specifically, as describe herein, a digital imaging method of analyzing pixel data of an image of a user's body for determining a hair density value of the user's hair is disclosed. The digital imaging method comprises aggregating, at one or more processors communicatively coupled to one or more memories, a plurality of training images of a plurality of users, each of the training images comprising pixel data of a respective user's body or body area. The digital imaging method further includes training, by the one or more processors with the pixel data of the plurality of training images, a hair density model comprising a hair density scale and operable to output, across a range of the hair density scale, hair density values associated with a degree of hair density ranging from least dense to most dense. The digital imaging method further includes receiving, at the one or more processors, at least one image of a user, the at least one image captured by a digital camera, and the at least one image comprising pixel data of the user's body or body area. The digital imaging method further includes analyzing, by the hair density model executing on the one or more processors, the at least one image captured by the digital camera to determine a user-specific hair density value of the user's hair. The digital imaging method further includes generating, by the one or more processors based on the user-specific hair density value, at least one product recommendation for a manufactured product, the manufactured product designed to address at least one feature identifiable within the pixel data of the user's body or body area.

In addition, as described herein, a digital imaging system is configured to analyze pixel data of an image of a user's body for determining a hair density value of the user's hair is disclosed. The digital imaging system comprises an imaging server comprising a server processor and a server memory; an imaging application (app) configured to execute on a user computing device comprising a device processor and a device memory, and the imaging app communicatively coupled to the imaging server; and a hair density model trained with pixel data of a plurality of training images of a plurality of users and operable to output, across a range of the hair density scale, hair density values associated with a degree of hair density ranging from least dense to most dense. The hair density model is configured to execute on the server processor or the device processor to cause the server processor or the device processor to: receive at least one image of a user, the at least one image captured by a digital camera, and the at least one image comprising pixel data of the user's body or body area; analyze, by the hair density model, the at least one image captured by the digital camera to determine a user-specific hair density value of the user's hair; generate, based on the user-specific hair density value, at least one product recommendation for a manufactured product, the manufactured product designed to address at least one feature identifiable within the pixel data of the user's body or body area; and render, on a display screen of the user computing device of the user, the at least one product recommendation.

Further, as described herein, a tangible, non-transitory computer-readable medium storing instructions for analyzing pixel data of an image of a user's body for determining a hair density value of the user's hair is disclosed. The instructions, when executed by one or more processors cause the one or more processors to: aggregate, at one or more processors communicatively coupled to one or more memories, a plurality of training images of a plurality of users, each of the training images comprising pixel data of a respective user's body or body area; train, by the one or more processors with the pixel data of the plurality of training images, a hair density model comprising a hair density scale and operable to output, across a range of the hair density scale, hair density values associated with a degree of hair density ranging from least dense to most dense; receive, at the one or more processors, at least one image of a user, the at least one image captured by a digital camera, and the at least one image comprising pixel data of the user's body or body area; analyze, by the hair density model executing on the one or more processors, the at least one image captured by the digital camera to determine a user-specific hair density value of the user's hair; generate, by the one or more processors based on the user-specific hair density value, at least one product recommendation for a manufactured product, the manufactured product designed to address at least one feature identifiable within the pixel data of the user's body or body area; and render, on a display screen of a user computing device, the product recommendation.

In accordance with the above, and with the disclosure herein, the present disclosure includes improvements in computer functionality or in improvements to other technologies at least because the disclosure describes that, e.g., an imaging server, or otherwise computing device (e.g., a user computing device), is improved where the intelligence or predictive ability of the imaging server or computing device is enhanced by a trained (e.g., machine learning trained) hair density model. The hair density model, executing on the imaging server or user computing device, is able to accurately identify, based on pixel data of other users, a user-specific hair density value and at least one product recommendation for a manufactured product designed to address at least one feature identifiable within the pixel data of the user's body or body area. That is, the present disclosure describes improvements in the functioning of the computer itself or "any other technology or technical field" because an imaging server or user computing device, is enhanced with a plurality of training images (e.g., 10,000s of training images and related pixel data) to accurately predict, detect, or determine pixel data of a user-specific image(s), such as newly provided customer images. This improves over the prior art at least because existing systems lack such predictive or classification functionality and are simply not capable of accurately analyzing user-specific images to output a predictive result to address at least one feature identifiable within the pixel data of the user's body or body area.

For similar reasons, the present disclosure relates to improvement to other technologies or technical fields at least because the present disclosure describes or introduces improvements to computing devices in the field of shaving razors and accompanying products, whereby the trained hair density model executing on the imaging devices or computing devices improve the field of shaving and/or shaving devices with digital and/or artificial intelligence based analysis of user-specific images to output a predictive result to address user-specific pixel data of at least one feature identifiable within the pixel data of the user's body or body area.

In addition, the present disclosure includes specific features other than what is well-understood, routine, conventional activity in the field, or adding unconventional steps that confine the claim to a particular useful application, e.g., analyzing pixel data of an image of a user's body for determining a hair density value of the user's hair as described herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 2A illustrates an example image and its related pixel data that may be used for training and/or implementing a hair density model, in accordance with various embodiments disclosed herein.

FIG. 2B illustrates a further example image and its related pixel data that may be used for training and/or implementing a hair density model, in accordance with various embodiments disclosed herein.

FIG. 2C illustrates a further example image and its related pixel data that may be used for training and/or implementing a hair density model, in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION OF THE INVENTION

Figure 1:
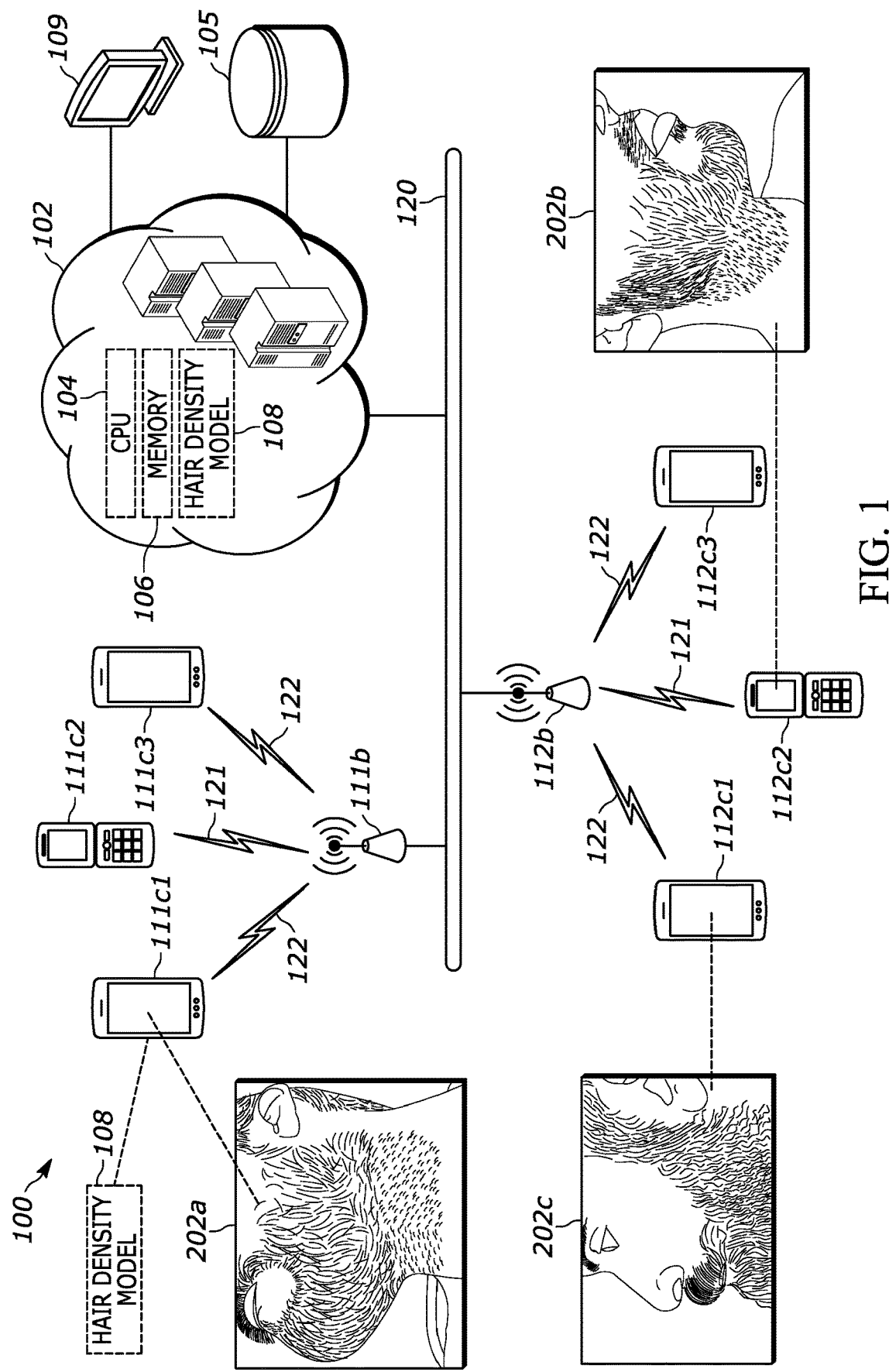
FIG. 1 illustrates an example digital imaging system configured to analyze pixel data of an image of a user's body for determining a hair density value of the user's hair, in accordance with various embodiments disclosed herein.

FIG. 1 illustrates an example digital imaging system 100 configured to analyze pixel data of an image (e.g., any one or more of images 202a, 202b, and/or 202c) of a user's body for determining a hair density value of the user's hair, in accordance with various embodiments disclosed herein. As referred to herein, a "body" may refer to any portion of the human body including the torso, waist, face, head, arm, leg, or other appendage or portion or part of the body thereof. In the example embodiment of FIG. 1, digital imaging system 100 includes server(s) 102, which may comprise one or more computer servers. In various embodiments server(s) 102 comprise multiple servers, which may comprise a multiple, redundant, or replicated servers as part of a server farm. In still further embodiments, imaging server(s) 102 may be implemented as cloud-based servers, such as a cloud-based computing platform. For example, server(s) 102 may be any one or more cloud-based platform(s) such as MICROSOFT AZURE, AMAZON AWS, or the like. Server(s) 102 may include one or more processor(s) 104 as well as one or more computer memories 106. Server(s) 102 may be referred to herein as "imaging server(s)."

The memories 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memorie(s) 106 may store an operating system (OS) (e.g., Microsoft Windows, Linux, Unix, etc.) capable of facilitating the functionalities, apps, methods, or other software as discussed herein. The memorie(s) 106 may also store a hair density model 108, which may be an artificial intelligence based model, such as a machine learning model trained on various images (e.g., images 202a, 202b, and/or 202c), as described herein. Additionally, or alternatively, the hair density model 108 may also be stored in database 105, which is accessible or otherwise communicatively coupled to imaging server(s) 102, and/or in the memory(s) of one or more user computing devices 111c1-111c3 and/or 112c1-112c3. The memories 106 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, an imaging based machine learning model or component, such as the hair density model 108, where each may be configured to facilitate their various functionalities discussed herein. It should be appreciated that one or more other applications may be envisioned and that are executed by the processor(s) 104.

The processor(s) 104 may be connected to the memories 106 via a computer bus responsible for transmitting electronic data, data packets, or otherwise electronic signals to and from the processor(s) 104 and memories 106 in order to implement or perform the machine readable instructions, methods, processes, elements or limitations, as illustrated, depicted, or described for the various flowcharts, illustrations, diagrams, figures, and/or other disclosure herein.

The processor(s) 104 may interface with the memory 106 via the computer bus to execute the operating system (OS). The processor(s) 104 may also interface with the memory 106 via the computer bus to create, read, update, delete, or otherwise access or interact with the data stored in the memories 106 and/or the database 104 (e.g., a relational database, such as Oracle, DB2, MySQL, or a NoSQL based database, such as MongoDB). The data stored in the memories 106 and/or the database 105 may include all or part of any of the data or information described herein, including, for example, training images and/or user images (e.g., either of which including any one or more of images 202a, 202b, and/or 202c) or other information of the user, including demographic, age, race, skin type, or the like.

The imaging server(s) 102 may further include a communication component configured to communicate (e.g., send and receive) data via one or more external/network port(s) to one or more networks or local terminals, such as computer network 120 and/or terminal 109 (for rendering or visualizing) described herein. In some embodiments, imaging server(s) 102 may include a client-server platform technology such as ASP.NET, Java J2EE, Ruby on Rails, Node.js, a web service or online API, responsive for receiving and responding to electronic requests. The imaging server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein. According to some embodiments, the imaging server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some embodiments, computer network 120 may comprise a private network or local area network (LAN). Additionally, or alternatively, computer network 120 may comprise a public network such as the Internet.

Imaging server(s) 102 may further include or implement an operator interface configured to present information to an administrator or operator and/or receive inputs from the administrator or operator. As shown in FIG. 1, an operator interface may provide a display screen (e.g., via terminal 109). Imaging server(s) 102 may also provide I/O components (e.g., ports, capacitive or resistive touch sensitive input panels, keys, buttons, lights, LEDs), which may be directly accessible via or attached to imaging server(s) 102 or may be indirectly accessible via or attached to terminal 109. According to some embodiments, an administrator or operator may access the server 102 via terminal 109 to review information, make changes, input training data or images, and/or perform other functions.

As described above herein, in some embodiments, imaging server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

As shown in FIG. 1, imaging server(s) 102 are communicatively connected, via computer network 120 to the one or more user computing devices 111*c*1-111*c*3 and/or 112*c*1-112*c*3 via base stations 111*b* and 112*b*. In some embodiments, base stations 111*b* and 112*b* may comprise cellular base stations, such as cell towers, communicating to the one or more user computing devices 111*c*1-111*c*3 and 112*c*1-112*c*3 via wireless communications 121 based on any one or more of various mobile phone standards, including NMT, GSM, CDMA, UMMTS, LTE, 5G, or the like. Additionally or alternatively, base stations 111*b* and 112*b* may comprise routers, wireless switches, or other such wireless connection points communicating to the one or more user computing devices 111*c*1-111*c*3 and 112*c*1-112*c*3 via wireless communications 122 based on any one or more of various wireless standards, including by non-limiting example, IEEE 802.11a/b/c/g (WIFI), the BLUETOOTH standard, or the like.

Any of the one or more user computing devices 111*c*1-111*c*3 and/or 112*c*1-112*c*3 may comprise mobile devices and/or client devices for accessing and/or communications with imaging server(s) 102. In various embodiments, user computing devices 111*c*1-111*c*3 and/or 112*c*1-112*c*3 may comprise a cellular phone, a mobile phone, a tablet device, a personal data assistance (PDA), or the like, including, by non-limiting example, an APPLE iPhone or iPad device or a GOOGLE ANDROID based mobile phone or tablet. In still further embodiments, user computing devices 111*c*1-111*c*3 and/or 112*c*1-112*c*3 may comprise a home assistant device and/or personal assistant device, e.g., having display screens, including, by way of non-limiting example, any one or more of a GOOGLE HOME device, an AMAZON ALEXA device, an ECHO SHOW device, or the like.

In additional embodiments, user computing devices 111*c*1-111*c*3 and/or 112*c*1-112*c*3 may comprise a retail computing device. A retail computing device would be configured in the same or similar manner, e.g., as described herein for user computing devices 111*c*1-111*c*3, including having a processor and memory, for implementing, or communicating with (e.g., via server(s) 102), a hair density model 108 as described herein. However, a retail computing device may be located, installed, or otherwise positioned within a retail environment to allow users and/or customers of the retail environment to utilize the digital imaging systems and methods on site within the retail environment. For example, the retail computing device may be installed within a kiosk for access by a user. The user may then upload or transfer images (e.g., from a user mobile device) to the kiosk to implement the digital imaging systems and methods described herein. Additionally, or alternatively, the kiosk may be configured with a camera to allow the user to take new images (e.g., in a private manner where warranted) of himself or herself for upload and transfer. In such embodiments, the user or consumer himself or herself would be able to use the retail computing device to receive and/or have rendered a user-specific electronic recommendation, as described herein, on a display screen of the retail computing device. Additionally, or alternatively, the retail computing device may be a mobile device (as described herein) as carried by an employee or other personnel of the retail environment for interacting with users or consumers on site. In such embodiments, a user or consumer may be able to interact with an employee or otherwise personnel of the retail environment, via the retail computing device (e.g., by transferring images from a mobile device of the user to the retail computing device or by capturing new images by a camera of the retail computing device), to receive and/or have rendered a user-specific electronic recommendation, as described herein, on a display screen of the retail computing device.

In addition, the one or more user computing devices 111*c*1-111*c*3 and/or 112*c*1-112*c*3 may implement or execute an operating system (OS) or mobile platform such as Apple's iOS and/or Google's Android operation system. Any of the one or more user computing devices 111*c*1-111*c*3 and/or 112*c*1-112*c*3 may comprise one or more processors and/or one or more memories for storing, implementing, or executing computing instructions or code, e.g., a mobile application or a home or personal assistant application, as described in various embodiments herein. As shown in FIG. 1, hair density model 108 may also be stored locally on a memory of a user computing device (e.g., user computing device 111*c*1).

User computing devices 111*c*1-111*c*3 and/or 112*c*1-112*c*3 may comprise a wireless transceiver to receive and transmit wireless communications 121 and/or 122 to and from base stations 111*b* and/or 112*b*. Pixel based images 202*a*, 202*b*, and/or 202*c* may be transmitted via computer network 120 to imaging server(s) 102 for training of model(s) and/or imaging analysis as describe herein.

In addition, the one or more user computing devices 111c1-111c3 and/or 112c1-112c3 may include a digital camera and/or digital video camera for capturing or taking digital images and/or frames (e.g., which can be any one or more of images 202a, 202b, and/or 202c). Each digital image may comprise pixel data for training or implementing model(s), such as AI or machine learning models, as described herein. For example, a digital camera and/or digital video camera of, e.g., any of user computing devices 111c1-111c3 and/or 112c1-112c3 may be configured to take, capture, or otherwise generate digital images (e.g., pixel based images 202a, 202b, and/or 202c) and, at least in some embodiments, may store such images in a memory of a respective user computing devices.

Still further, each of the one or more user computer devices 111c1-111c3 and/or 112c1-112c3 may include a display screen for displaying graphics, images, text, product recommendations, data, pixels, features, and/or other such visualizations or information as described herein. In various embodiments, graphics, images, text, product recommendations, data, pixels, features, and/or other such visualizations or information may be received by server(s) 102 for display on the display screen of any one or more of user computer devices 111c1-111c3 and/or 112c1-112c3. Additionally or alternatively, a user computer device may comprise, implement, have access to, render, or otherwise expose, at least in part, an interface or a guided user interface (GUI) for displaying text and/or images on its display screen.

FIGS. 2A-2C illustrate example images 202a, 202b, and 202c that may be collected or aggregated at imaging server(s) 102 and may be analyzed by, and/or used to train, a hair density model (e.g., an AI model such as a machine learning imaging model as describe herein). Each of these images may comprise pixel data (e.g., RGB data) corresponding representing feature data and corresponding to each of the personal attributes of the respective users 202au, 202bu, and 202cu, within the respective image. The pixel data may be captured by a digital camera of one of the user computing devices (e.g., one or more user computer devices 111c1-111c3 and/or 112c1-112c3). In various embodiments, the at least one image of the user may be captured by the digital camera in conjunction with a hair removal event associated with at least a portion of the user's body or body area represented in the at least one image of the user. For example, the at least one image may be captured within 24 hours of when a user intends and/or has recently shaved/trimmed their body or body area.

Generally, as described herein, pixel data (e.g., pixel data 202ap, 202bp, and/or 202cp) comprises user points or squares of data within an image, where each point or square represents a single pixel (e.g., pixel 202ap1 and pixel 202ap2) within an image. Each pixel may be a specific location within an image. In addition, each pixel may have a specific color (or lack thereof). Pixel color may be determined by a color format and related channel data associated with a given pixel. For example, a popular color format includes the red-green-blue (RGB) format having red, green, and blue channels. That is, in the RGB format, data of a pixel is represented by three numerical RGB components (Red, Green, Blue), that may be referred to as a channel data, to manipulate the color of pixel's area within the image. In some implementations, the three RGB components may be represented as three 8-bit numbers for each pixel. Three 8-bit bytes (one byte for each of RGB) is used to generate 24 bit color. Each 8-bit RGB component can have 256 possible values, ranging from 0 to 255 (i.e., in the base 2 binary system, an 8 bit byte can contain one of 256 numeric values ranging from 0 to 255). This channel data (R, G, and B) can be assigned a value from 0 255 and be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values. So (Red=220, Green=220, Blue=220) is a light gray (near white), and (Red=40, Green=40, Blue=40) is a dark gray (near black).

In this way, the composite of three RGB values creates the final color for a given pixel. With a 24-bit RGB color image using 3 bytes there can be 256 shades of red, and 256 shades of green, and 256 shades of blue. This provides 256×256×256, i.e., 16.7 million possible combinations or colors for 24 bit RGB color images. In this way, the pixel's RGB data value shows how much of each of Red, and Green, and Blue the pixel is comprised of. The three colors and intensity levels are combined at that image pixel, i.e., at that pixel location on a display screen, to illuminate a display screen at that location with that color. It is to be understood, however, that other bit sizes, having fewer or more bits, e.g., 10-bits, may be used to result in fewer or more overall colors and ranges.

As a whole, the various pixels, positioned together in a grid pattern, form a digital image (e.g., pixel data 202ap, 202bp, and/or 202cp). A single digital image can comprise thousands or millions of pixels. Images can be captured, generated, stored, and/or transmitted in a number of formats, such as JPEG, TIFF, PNG and GIF. These formats use pixels to store represent the image.

FIG. 2A illustrates an example image 202a and its related pixel data (e.g., pixel data 202ap) that may be used for training and/or implementing a hair density model (e.g., hair density model 108), in accordance with various embodiments disclosed herein. Example image 202a illustrates a user 202au or individual displaying hair growth at a body area location comprising the user's neck. For example, image 202a may represent the user 202au displaying their hair growth on their neck before they attempt to shave their neck. Alternatively, image 202a may represent the user 202au displaying their hair growth on their neck after they have trimmed their neck and/or while the user 202au is in the process of shaving/trimming their neck. In various embodiments, the body area location comprises at least one of user's face, the user's cheek, the user's neck, the user's jaw, the user's head, the user's groin, the user's underarm, the user's chest, the user's back, the user's leg, the user's arm, or the user's bikini area.

Image 202a is comprised of pixel data, including pixel data 202ap. Pixel data 202ap includes a plurality of pixels including pixel 202ap 1 and pixel 202ap2. Pixel 202ap 1 is a dark pixel (e.g., a pixel with low R, G, and B values) positioned in image 202a resulting from user 202au having a relatively high degree of hair density at the position represented by pixel 202ap1 due to, for example, the hair on the user's 202au neck approaching a dense region of user's 202au facial hair (e.g., on the user's 202au jaw). Pixel 202ap2 is a light (e.g., bright) pixel (e.g., a pixel with high R, G, and/or B values) positioned in image 202a resulting from user 202au having a relatively low degree of hair density at the position represented by pixel 202ap2.

Pixel data 202*ap* includes various remaining pixels including remaining portions of the user's neck area featuring varying degrees of hair density (e.g., high degree of hair density near jawline, low degree of hair density near bottom of neck, etc.). Pixel data 202*ap* further includes pixels representing further features including the undulations of the user's skin due to anatomical features of the neck and other features as shown in FIG. 2A.

FIG. 2B illustrates a further example image 202*b* and its related pixel data (e.g., pixel data 202*bp*) that may be used for training and/or implementing a hair density model (e.g., hair density model 108), in accordance with various embodiments disclosed herein. Example image 202*b* illustrates a user 202*bu* displaying hair growth at a body area location comprising the user's jaw. For example, image 202*b* may represent the user 202*bu* displaying their hair growth on their jaw before they attempt to shave their jaw. Alternatively, image 202*b* may represent the user 202*bu* displaying their hair growth on their jaw after they have trimmed their jaw and/or while the user 202*bu* is in the process of shaving/trimming their jaw.

Image 202*b* is comprised of pixel data, including pixel data 202*bp*. Pixel data 202*bp* includes a plurality of pixels including pixel 202*bp*1 and pixel 202*bp*2. Pixel 202*bp*1 is a light pixel (e.g., a pixel with high R, G, and/or B values) positioned in image 202*b* resulting from user 202*bu* having a relatively low degree of hair density at the position represented by pixel 202*bp*. Pixel 202*bp*1 is a dark pixel (e.g., a pixel with low R, G, and B values) positioned in image 202*b* resulting from user 202*bu* having a relatively high degree of hair density at the position represented by pixel 202*bp*2 due to, for example, the hair on the user's 202*bu* jaw representing a denser region of user's 202*bu* facial hair than the region represented by pixel 202*bp*1.

Pixel data 202*bp* includes various remaining pixels including remaining portions of the user's jaw area featuring varying degrees of hair density (e.g., high degree of hair density near jawline, low degree of hair density nearer to cheek, etc.). Pixel data 202*bp* further includes pixels representing further features including the undulations of the user's skin due to anatomical features of the jaw and other features as shown in FIG. 2B.

FIG. 2C illustrates a further example image 202*c* and its related pixel data (e.g., 202*cp*) that may be used for training and/or implementing a hair density model (e.g., hair density model 108), in accordance with various embodiments disclosed herein. Example image 202*c* illustrates a user 202*cu* displaying hair growth at a body area location comprising the user's cheek. For example, image 202*c* may represent the user 202*cu* displaying their hair growth on their cheek before they attempt to shave their cheek. Alternatively, image 202*c* may represent the user 202*cu* displaying their hair growth on their cheek after they have cleanly shaven their cheek and/or while the user 202*bu* is in the process of shaving/trimming their cheek.

Image 202*c* is comprised of pixel data, including pixel data 202*cp*. Pixel data 202*cp* includes a plurality of pixels including pixel 202*cp*1 and pixel 202*cp*2. Pixel 202*cp*1 is a dark pixel (e.g., a pixel with low R, G, and B values) positioned in image 202*c* resulting from user 202*cu* having a relatively high degree of hair density at the position represented by pixel 202*cp*1. Pixel 202*cp*2 is a light pixel (e.g., a pixel with high R, G, and/or B values) positioned in image 202*c* resulting from user 202*cu* having a relatively low degree of hair density at the position represented by pixel 202*cp*2 due to, for example, no hair growth on the user's 202*cu* cheek at the position represented by pixel 202*cp*2.

Pixel data 202*cp* includes various remaining pixels including remaining portions of the user's cheek area featuring varying degrees of hair density (e.g., high degree of hair density near jawline, low degree of hair density nearer to cheek, etc.). Pixel data 202*cp* further includes pixels representing further features including the undulations of the user's skin due to anatomical features of the cheek and other features as shown in FIG. 2C.

It is to be understood that each of the images represented in FIGS. 2A-2C may represent a user or user (e.g., users 202*au*-202*cu*) at any point before, during, and/or after a shave and/or trim. For example, image 202*a* may represent the user 202*au* before they attempt to shave/trim their neck area, image 202*b* may represent the user 202*bu* during a shave/trim of their jaw area, and image 202*c* may represent the user 202*cu* after they have shaved/trimmed their cheek area. Moreover, such images may arrive and be processed in accordance with a hair density model (e.g., hair density model 108), as described further herein, in real-time and/or near real-time. For example, the user 202*bu* may capture image 202*b* during a shave/trim, and the hair density model may provide feedback, recommendations, and/or other comments in real-time or near real-time.

Figure 3:
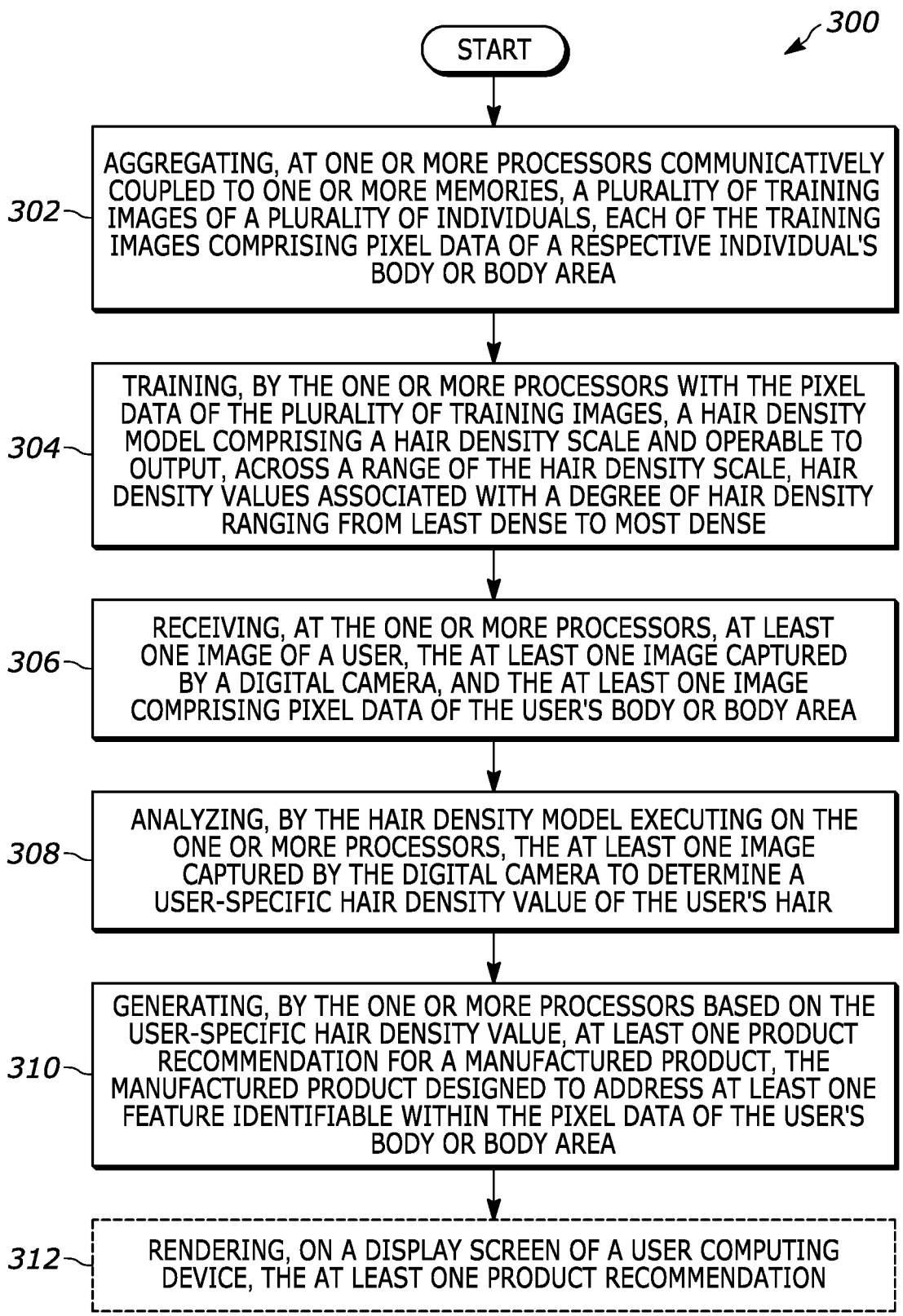
FIG. 3 illustrates a diagram of a digital imaging method of analyzing pixel data of an image of a user's body for determining a hair density value of the user's hair, in accordance with various embodiments disclosed herein.

FIG. 3 illustrates a diagram of a digital imaging method 300 of analyzing pixel data of an image (e.g., images 202*a*, 202*b*, and/or 202*c*) of a user's body for determining a hair density value of the user's hair, in accordance with various embodiments disclosed herein. Images, as described herein, are generally pixel images as captured by a digital camera (e.g., a digital camera of user computing device 111*c*1). In some embodiments an image may comprise or refer to a plurality of images such as a plurality of images (e.g., frames) as collected using a digital video camera. Frames comprise consecutive images defining motion, and can comprise a movie, a video, or the like.

At block 302, method 300 comprises aggregating, at one or more processors communicatively coupled to one or more memories, a plurality of training images of a plurality of users, each of the training images comprising pixel data of a respective user's body or body area. For example, the pixel data may represent a respective user's neck (e.g., as illustrated in FIG. 2A), a respective user's jaw (e.g., as illustrated in FIG. 2B), a respective user's cheek (e.g., as illustrated in FIG. 2C), a respective user's head, a respective user's groin, a respective user's underarm, a respective user's chest, a respective user's back, a respective user's leg, a respective user's arm, and/or a respective user's bikini area.

At block 304 method 300 comprises training, by the one or more processors with the pixel data of the plurality of training images, a hair density model (e.g., hair density model 108) comprising a hair density scale and operable to output, across a range of the hair density scale, hair density values associated with a degree of hair density ranging from least dense to most dense. The hair density scale can be an internalized scale or otherwise custom scale, unique to the hair density model, where a least or small hair density value may be determined from an image or set of images having skin areas with low hair density values, i.e., images where the pixel data indicates that a skin area includes a low number of hair follicles or a sparse distribution of hair follicles. Similarly, a most or large hair density value may be determined from an image or set of images having skin areas with high hair density values, i.e., images where the pixel data indicates that a skin area includes a high number of hair follicles or a dense concentration of hair follicles. Moreover, hair density values may be determined at the pixel level or for a given skin area (e.g., one or more pixels) in an image.

In some embodiments, the hair density scale may be a percentage scale, e.g., outputting hair density values from 0% to 100%, where 0% represents least hair density and 100% represents most hair density. Values can range across this scale where a hair density value of 67% represents one or more pixels of a skin area detected within an image that has a higher hair density value than a hair density value of 10% as detected for one or more pixels of a skin area within the same image or a different image (of the same or different user).

In some embodiments, the hair density scale may be a numerical or decimal based scale, e.g., outputting hair density values, e.g., from 0 to 10, where 0 represents least hair density and 10 represents most hair density. Values can range across this scale where a hair density value of 78.9 represents one or more pixels of a skin area detected within an image that has a higher hair density value than a hair density value of 21.3 as detected for one or more pixels of a skin area within the same image or a different image (of the same or different user).

In some embodiments, a comprehensive hair density value, which can be a user-specific hair density value as described herein, may be determined by averaging (or otherwise statistically analyzing) hair density values for one or more pixels of a given skin area.

In various embodiments, hair density model is an artificial intelligence (AI) based model trained with at least one AI algorithm. Training of hair density model 108 involves image analysis of the training images to configure weights of hair density model 108, and its underlying algorithm (e.g., machine learning or artificial intelligence algorithm) used to predict and/or classify future images. For example, in various embodiments herein, generation of hair density model 108 involves training hair density model 108 with the plurality of training images of a plurality of users, where each of the training images comprise pixel data of a respective user's body or body area. In some embodiments, one or more processors of a server or a cloud-based computing platform (e.g., imaging server(s) 102) may receive the plurality of training images of the plurality of users via a computer network (e.g., computer network 120). In such embodiments, the server and/or the cloud-based computing platform may train the hair density model with the pixel data of the plurality of training images.

In various embodiments, a machine learning imaging model, as described herein (e.g., hair density model 108), may be trained using a supervised or unsupervised machine learning program or algorithm. The machine learning program or algorithm may employ a neural network, which may be a convolutional neural network, a deep learning neural network, or a combined learning module or program that learns in two or more features or feature datasets (e.g., pixel data) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some embodiments, the artificial intelligence and/or machine learning based algorithms may be included as a library or package executed on imaging server(s) 102. For example, libraries may include the TENSORFLOW based library, the PYTORCH library, and/or the SCIKIT-LEARN Python library.

Machine learning may involve identifying and recognizing patterns in existing data (such as training a model based on pixel data within images having pixel data of a respective user's body or body area) in order to facilitate making predictions or identification for subsequent data (such as using the model on new pixel data of a new user in order to determine a hair density value of the specific user's hair).

Machine learning model(s), such as the hair density model described herein for some embodiments, may be created and trained based upon example data (e.g., "training data" and related pixel data) inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

Image analysis may include training a machine learning based model (e.g., the hair density model) on pixel data of images of one or more user's body or body area. Additionally, or alternatively, image analysis may include using a machine learning imaging model, as previously trained, to determine, based on the pixel data (e.g., including their RGB values) of the one or more images of the user(s), a hair density value of the specific user's hair. The weights of the model may be trained via analysis of various RGB values of user pixels of a given image. For example, dark or low RGB values (e.g., a pixel with values R=25, G=28, B=31) may indicate a high hair density area of the user's skin. A red toned RGB value (e.g., a pixel with values R=215, G=90, B=85) may indicate irritated skin. A lighter RGB value (e.g., a pixel with R=181, G=170, and B=191) may indicate a low hair density area (e.g., such as a normal skin tone color).

Together, when a series of pixels in an analyzed region transition from dark or low RGB values to lighter RGB values (or vice versa), that may indicate a shift in the relative hair density of the portions of the respective user's body or body area represented by the series of pixels. For example, and as described further herein, an image may feature a respective user's cheek area, wherein the user's facial hair is relatively dense near their jaw and is less dense near their cheekbones. The analyzed region may include pixels representative of the respective user's cheekbone and their jaw, such that pixels indicative of the respective user's cheek may have a lighter RGB value than the pixels indicative of the respective user's jaw. In this way, pixel data (e.g., detailing one or more features of a user, such as a respective user's body or body area including degrees of hair density) of 10,000s training images may be used to train or use a machine learning imaging model to determine a hair density value of the specific user's hair.

In various embodiments, wherein training, by the one or more processors (e.g., of imaging server(s) 102) with the pixel data of the plurality of training images, the hair density model (e.g., hair density model 108) comprises training the hair density model (e.g., hair density model 108) to detect an amount of hair follicles on the user's skin to determine the user-specific hair density value of the user's hair. In such embodiments, the hair density model may be trained to recognize that pixels with darker values (e.g., darker or lower RGB values) indicate a high number of hair follicles on the specific user's skin. For example, for image 202a, pixel 202ap1 is a dark pixel positioned in image 202a resulting from user 202au having a relatively high degree of hair density at the position represented by pixel 202ap1 due to, for example, the hair on the user's 202au neck approaching a dense region of user's 202au facial hair (e.g., on the user's 202au jaw). Pixel 202ap2 is a light (e.g., bright) pixel (e.g., a pixel with high R, G, and/or B values) positioned in image 202a resulting from user 202au having a relatively low degree of hair density at the position represented by pixel 202ap2. Pixel data 202ap includes various remaining pixels including remaining portions of the user's neck area featuring varying degrees of hair density (e.g., high degree of hair density near jawline, low degree of hair density near bottom of neck, etc.). Hair density model 108 may be trained to recognize (by assigning greater weighs to darker pixels) that such darker pixels (e.g., pixel 202ap1) against a pixel or group of pixels having lighter RGB values indicates a higher hair density corresponding to the darker pixels. In this manner, the hair density model can identify patterns within the pixel data to determine a hair density value of the specific user's hair.

In various embodiments, the hair density model (e.g., hair density model 108) may be further trained, by one or more processors (e.g., of imaging server(s) 102) with the pixel data of the plurality of training images, to output one or more location identifiers indicating one or more corresponding body area locations of respective users. In such embodiments, the hair density model (e.g., hair density model 108), executing on the one or more processors (e.g., imaging server(s) 102) and analyzing the at least one image of the user, can determine a location identifier indicating a body area location of the user's body or body area. For example, body area locations may comprise a user's neck, a user's jaw, a user's cheek, a user's head, a user's groin, a user's underarm, a user's chest, a user's back, a user's leg, a user's arm, and/or a user's bikini area. For example, each of images 202a, 202b, and 202c illustrate example body area locations including a user's neck, a user's jaw, and a user's cheek, respectively.

With reference to FIG. 3, at block 306 method 300 comprises receiving, at the one or more processors (e.g., imaging server(s) 102 and/or a user computing device, such as user computing device 111c1), at least one image of a user. The at least one image may have been captured by a digital camera. Additionally, the at least one image may comprise pixel data of the user's body or body area.

In some embodiments, the at least one image comprises a plurality of images. In these embodiments, the plurality of images may be collected using a digital camera. For example, a user (e.g., any of users 202au, 202bu, and 202cu) may shave/trim multiple areas on their body and/or on a single body part. Accordingly, the user may collect multiple images, each featuring a respective body part or skin area intended to be shaved/trimmed for analysis by the hair density model (e.g., hair density model 108).

At block 308 method 300 comprises analyzing, by the hair density model (e.g., hair density model 108) executing on the one or more processors (e.g., imaging server(s) 102 and/or a user computing device, such as user computing device 111c1), the at least one image captured by the digital camera to determine a user-specific hair density value of the user's hair.

At block 310 method 300 comprises generating, by the one or more processors (e.g., imaging server(s) 102 and/or a user computing device, such as user computing device 111c1) based on the user-specific hair density value, at least one product recommendation designed to address at least one feature identifiable within the pixel data of the user's body or body area. For example, the at least one product recommendation may be a user-specific product recommendation for a manufactured product. Accordingly, the manufactured product may be designed to address at least one feature identifiable within the pixel data of the user's body or body area.

At optional block 312 method 300 comprises rendering, on a display screen of a user computing device, the at least one product recommendation. A user computing device may comprise at least one of a mobile device, a tablet, a handheld device, or a desktop device, for example, as described herein for FIG. 1. In some embodiments, the user computing device (e.g., user computing device 111c1) may receive the at least one image comprising the pixel data of the user's body or body area. In such embodiments, and the user computing device may execute the hair density model (e.g., hair density model 108) locally and generate, based on output of the hair density model (e.g., hair density model 108), the at least one product recommendation. The user computing device (e.g., user computing device 111c1) may then render the at least one product recommendation on its display screen.

Additionally, or alternatively, in other embodiments, the imaging server(s) 102 may analyze the user image remote from the user computing device to determine the user-specific hair density and/or user-specific product recommendation designed to address at least one feature identifiable within the pixel data of the user's body or body area. For example, in such embodiments imaging server or a cloud-based computing platform (e.g., imaging server(s) 102) receives, across computer network 120, the at least one image comprising the pixel data of the user's body or body area. The server or a cloud-based computing platform may then execute hair density model (e.g., hair density model 108) and generate, based on output of the hair density model (e.g., hair density model 108), the user-specific product recommendation. The server or a cloud-based computing platform may then transmit, via the computer network (e.g., computer network 120), the user-specific recommendation to the user computing device for rendering on the display screen of the user computing device.

In some embodiments, the user may submit a new image to the hair density model for analysis as described herein. In such embodiments, one or more processors (e.g., imaging server(s) 102 and/or a user computing device, such as user computing device 111c1) may receive a new image of the user. The new image may been captured by a digital camera of user computing device 111c1. The new image may comprise pixel data of the user's body or body area. For example, a user may initially submit an image of their cheek area (e.g., as illustrated in FIG. 2C) before, during, or after shaving/trimming their cheek. The user may then subsequently submit a new image featuring the user's cheek, the user's jaw (e.g., as illustrated in FIG. 2B), the user's neck (e.g., as illustrated in FIG. 2A), and/or any other suitable body area.

The hair density model (e.g., hair density model 108) may then analyze, on the one or more processors (e.g., imaging server(s) 102 and/or a user computing device, such as user computing device 111c1), the new image captured by the digital camera to determine a new user-specific hair density value of the user's hair. A new product recommendation may be generated, based on the new user-specific hair density value, regarding at least one feature identifiable within the pixel data of the new image. The new product recommendation may be a user-specific recommendation for a new manufactured product. For example, the user may initially submit an image of their neck area, and receive a product recommendation for shave gel or shaving cream. The user may then receive, after submission of a new image featuring their cheek, a new product recommendation for an aftershave product. The new product recommendation or comment (e.g., message) may then be rendered on a display screen of a user computing device of the user. Further in these embodiments, the new image of the user comprises pixel data indicative of a hair removal associated with at least a portion of the user's body or body area represented in the at least one image of the user, and the new manufactured product is designed to address the hair removal associated with at least a portion of the user's body or body area. For example, a user may submit an image featuring their cheek in an unshaven/untrimmed state. The user may shave/trim their cheek area, capture a new image featuring their shaved/trimmed cheek area (e.g., image 202c, specifically pixel 202cp2), and receive a new product recommendation for a product designed to address the user's hair removal.

In some embodiments, the hair density model may compare the new user-specific hair density value and the user-specific hair density value to generate a composite hair density value. Moreover, the new product recommendation may be further based on the composite hair density value, and the composite hair density value may be rendered on the display screen of the user computing device. In further embodiments, the new image comprises pixel data of a different portion of the user's body or body area relative to the at least one image. For example, the at least one image may be of a user's jaw, and the new image may be of the user's neck. The hair density model may then generate the composite hair density value by comparing the new user-specific hair density value of the user's neck with the user-specific hair density value of the user's jaw. As a result, the user computing device (e.g., user computing device 111c1) and/or imaging server(s) may generate the new product recommendation and may include a manufactured product as well as behavior and or hair style recommendations based on the composite hair density value. To illustrate, the user's neck may have a lower user-specific hair density value than the user's jaw. Accordingly, the user computing device may generate a new product recommendation indicating that the user may want to consider shaving their neck with a shaving gel/cream, and not shave their jaw to grow a beard that they can maintain and groom with a recommended beard oil.

Additionally or alternatively, the hair density model may generate the user-specific hair density value before a user shaves their face, and the hair density model may generate the new user-specific hair density value after the user shaves their face. Moreover, the hair density model may compare a new user-specific hair density value generated several shaves after the user-specific hair density value was generated. The composite hair density value may then represent the user's change in hair density value across multiple shaves, and/or it may represent the hair density model acknowledging that the user has completed their shave. In either case, the hair density model may more acutely recommend products or techniques to the user based upon the generated composite hair density value. For example, if the composite hair density value represents a user having completed their shave, the composite hair density value may reflect that by indicating a lowered hair density value from the beginning of the shave (e.g., the user-specific hair density value) to the end of the shave (e.g., the new user-specific hair density value). In addition, if the hair density model compares a new user-specific hair density value generated several shaves after the user-specific hair density value was generated, the composite hair density value may reflect a systemic hair loss/gain in the particular body area represented in the images by indicating a lowered/raised hair density value from the earlier shave image (e.g., the user-specific hair density value) to the later shave image (e.g., the new user-specific hair density value). Further in these embodiments, the new product recommendation may be based on the composite hair density value, and the composite hair density value may be rendered on the display screen of a user computing device (e.g., user computing device 111c1).

In some embodiments, at least one product recommendation may be displayed on the display screen of a user computing device (e.g., user computing device 111c1) with a graphical representation of the user's body or body area as annotated with one or more graphics or textual renderings corresponding to the user-specific hair density value. In still further embodiments, the at least one product recommendation may be rendered in real-time or near-real time during or after the user shaves/trims their body or body area.

In additional embodiments, at least one product recommendation may be displayed on the display screen of a user computing device (e.g., user computing device 111c1) with instructions (e.g., a message) for treating, with the manufactured product, the at least one feature identifiable within the pixel data of the user's body or body area. In still further embodiments, either the user computing device 111c1 and/or imaging server(s) may initiate, based on the at least one product recommendation, the manufactured product for shipment to the user.

In some embodiments, the user computing device (e.g., user computing device 111c1) and/or imaging server(s) may select, based upon the user-specific hair density value, a recommended behavior from at least two available behaviors. Further in these embodiments, the at least one product recommendation may include the recommended behavior. For example, the user computing device may recommend that a user shave all or a portion of their body or body area featured in the at least one image if the user-specific hair density value is relatively low. By contrast, the user computing device may recommend that a user not shave all or a portion of their body or body area featured in the at least one image if the user-specific hair density value is relatively high (e.g., to achieve a particular hair style). The user computing device may then include a suitable product in the at least one product recommendation to assist the user in accomplishing the recommended behavior (e.g., new razors to achieve a closer shave, shaving gel to reduce skin irritation in a high hair density value area, beard oil to maintain a beard, etc.).

In further embodiments, the at least one product recommendation may be displayed on a display screen of the user computing device with an augmented graphical representation of the user's body or body area. The augmented graphical representation may include at least one recommended hair style corresponding to the user-specific hair density value, and the at least one recommended hair style may be a feature that is graphically augmented onto the representation of the user's face as part of the augmented graphical representation as a prediction of the user's appearance with the feature. Generally, certain hair styles are only achievable with specific hair densities, and it is often difficult for a user to know what is achievable given their user-specific hair density. To solve this problem, the user computing device (e.g., user computing device 111c1) and/or imaging server(s) may utilize the user-specific hair density to identify hair styles that may be preferable for a user based upon their user-specific hair density. Accordingly, the at least one recommended hair style may be a list of the best potential hair styles a user may want to try based upon their user-specific hair density. Moreover, the at least one product recommendation may be specifically intended to help the user achieve the at least on recommended hair style (e.g., shaving products, styling products, etc.).

As an example of the above embodiment, if a user has a dense grouping of hairs on their upper lip, and a more sparse grouping of hairs on their jaw, the at least one product recommendation may include a recommendation for the user to grow a mustache. Further in this example, the user computing device (e.g., user computing device 111c1) and/or imaging server(s) may render a graphical representation of a mustache onto the user's upper lip to generate the augmented graphical representation of the user's body or body area. The user computing device may then display the augmented graphical representation featuring the user's face on the display screen. The user computing device may also display the at least one product recommendation suggesting that the user may want grooming products (e.g., shaving gel/cream, razors, aftershave) to shave the hair on their jaw and/or styling products (e.g., mustache wax, etc.) to maintain the look and/or feel of the at least one recommended hair style (a mustache).

In some embodiments, the user computing device is a retail computing device. Further in these embodiments, and in response to rendering the at least one product recommendation, the retail computing device may dispense the manufactured product for retrieval by the user. As an example, the retail computing device may render an at least one product recommendation on a display recommending that a user utilize shaving gel when shaving particularly dense areas. The retail computing device may then dispense shaving gel in accordance with the at least one product recommendation that the user may then retrieve from the retail computing device and purchase within the retail location. Additionally or alternatively, the retail computing device may provide an additional recommendation included in the at least one product recommendation providing the user with directions and/or a general location where the user may find the recommended product (e.g., the manufactured product) within the retail location in which the retail computing device is located. For example, the retail computing device may recommend shaving gel and additionally inform the user that shaving gel is located in the fifth isle of the retail location.

Figure 4:
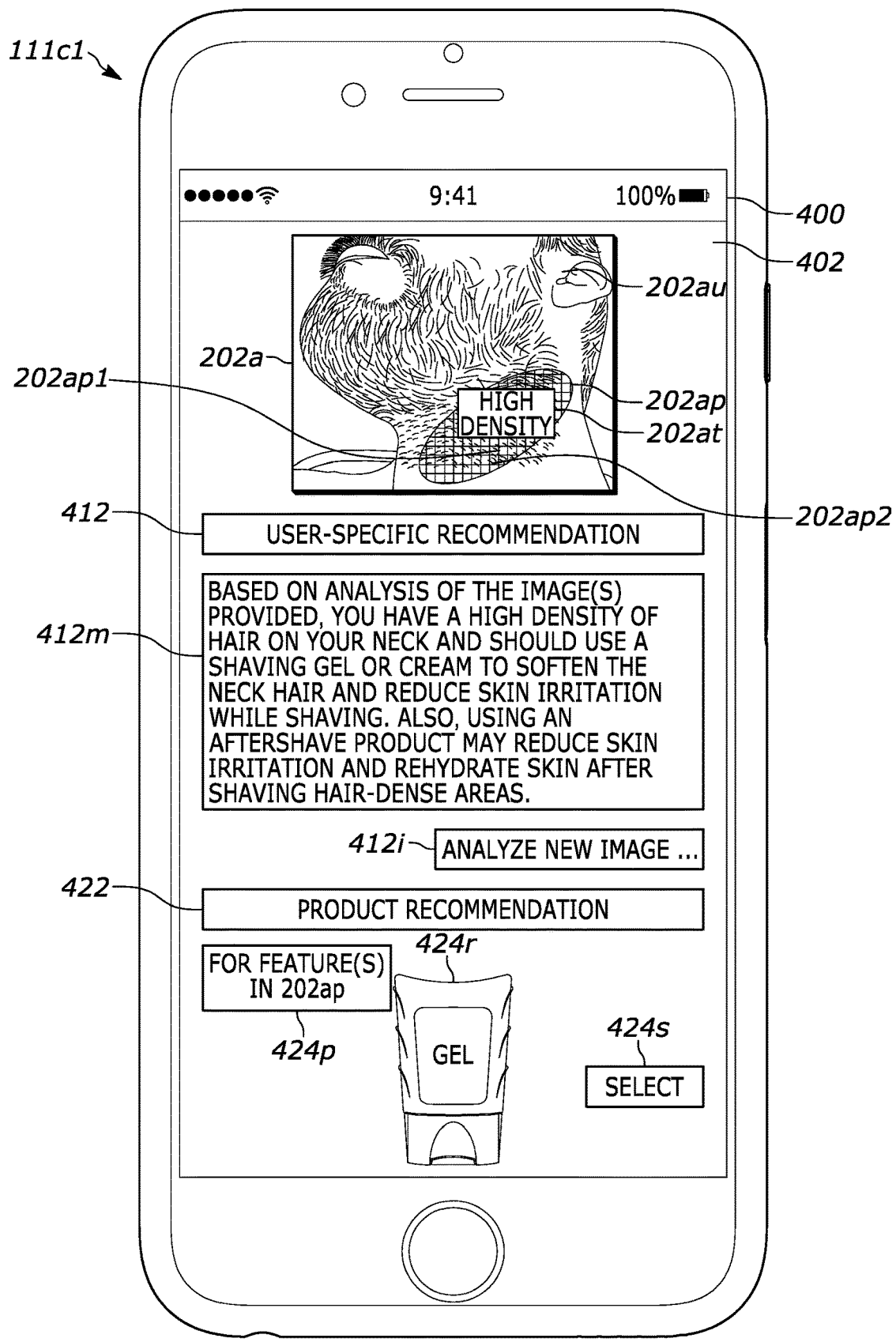
FIG. 4 illustrates an example user interface as rendered on a display screen of a user computing device in accordance with various embodiments disclosed herein.

FIG. 4 illustrates an example user interface 402 as rendered on a display screen 400 of a user computing device 111c1 in accordance with various embodiments disclosed herein. For example, as shown in the example of FIG. 4, user interface 402 may be implemented or rendered via an application (app) executing on user computing device 111c1.

For example, as shown in the example of FIG. 4, user interface 402 may be implemented or rendered via a native app executing on user computing device 111c1. In the example of FIG. 4, user computing device 111c1 is a user computer device as described for FIG. 1, e.g., where 111c1 is illustrated as an APPLE iPhone that implements the APPLE iOS operating system and has display screen 400. User computing device 111c1 may execute one or more native applications (apps) on its operating system. Such native apps may be implemented or coded (e.g., as computing instructions) in a computing language (e.g., SWIFT) executable by the user computing device operating system (e.g., APPLE iOS) by the processor of user computing device 111c1.

Additionally, or alternatively, user interface 402 may be implemented or rendered via a web interface, such as via a web browser application, e.g., Safari and/or Google Chrome app(s), or other such web browser or the like.

As shown in the example of FIG. 4, user interface 402 comprises a graphical representation (e.g., image 202a) of the user's skin. Image 202a may be the at least one image (or graphical representation thereof) of the user's body or body area as analyzed by the hair density model (e.g., hair density model 108) as described herein. In the example of FIG. 4, graphical representation (e.g., image 202a) of the user's body or body area is annotated with one or more graphics (e.g., area of pixel data 202ap) or textual rendering (e.g., text 202at) corresponding to the user-specific hair density. For example, the area of pixel data 202ap may be annotated or overlaid on top of the image of the user (e.g., image 202a) to highlight the area or feature(s) identified within the pixel data (e.g., feature data and/or raw pixel data) by the hair density model (e.g., hair density model 108). In the example of FIG. 4, the feature(s) identified within area of pixel data 202ap may include the user-specific hair density of the user's neck area, the hair density of the portion of the user's neck represented by pixel 202ap2, irritation of the skin, skin type, skin tone, and other features shown in area of pixel data 202ap. In various embodiments, the pixels identified as the specific features indicating high hair density values (e.g., pixel 202ap1 as a dark pixel) or lower hair density values (e.g., pixel 202ap2 a lighter pixel) may be highlighted or otherwise annotated when rendered.

Textual rendering (e.g., text 202at) shows a user-specific hair density value (e.g., High Density) which illustrates that the user's hair density is high in the indicated region of the user's neck. The high density value indicates, for example, that the user may want to take precautions when shaving/trimming the indicated region of their neck (e.g., using a shaving gel/cream, washing user's neck with warm water pre-shave/trim). It is to be understood that other textual rendering types or values are contemplated herein, where textual rendering types or values may be rendered, for example, as hairs per square inch, hairs per square millimeter, total estimated hairs, or the like. Additionally, or alternatively, color values may be used and/or overlaid on a graphical representation shown on user interface 402 (e.g., image 202a) to indicate high hair density values, low hair density values, or average hair density values.

User interface 402 may also include or render a user-specific electronic recommendation 412. In the embodiment of FIG. 4, user-specific electronic recommendation 412 comprises a message 412m to the user designed to address at least one feature identifiable within the pixel data of the user's body or body area. As shown in the example of FIG. 4, message 412m recommends to the user to apply a shaving gel or cream to their neck to soften the neck hair and reduce skin irritation while shaving.

Message 412m further recommends use of an aftershave product to reduce skin irritation and rehydrate the user's skin after shaving hair-dense areas. The aftershave recommendation can be made based on the high hair density value associated with the user's neck that likely experiences higher pressure shaving strokes and/or more shaving strokes than a lower hair density value area (e.g., pixel 202ap2). Accordingly, the aftershave product is designed to address the issue of skin irritation and/or dehydration detected in the pixel data of image 202a or otherwise assumed based on the high hair density value. The product recommendation can be correlated to the identified feature within the pixel data, and the user computing device 111c1 and/or server(s) 102 can be instructed to output the product recommendation when the feature (e.g., excessive pressure, skin irritation, skin dehydration, etc.) is identified.

User interface 402 may also include or render a section for a product recommendation 422 for a manufactured product 424r (e.g., aftershave as described above). The product recommendation 422 generally corresponds to the user-specific electronic recommendation 412, as described above. For example, in the example of FIG. 4, the user-specific electronic recommendation 412 is displayed on display screen 400 of user computing device 111c1 with instructions (e.g., message 412m) for treating, with the manufactured product (manufactured product 424r (e.g., aftershave)) at least one feature (e.g., high hair density at pixel 202ap1) identifiable the pixel data (e.g., pixel data 202ap) of the user's body or body area (e.g., the user's neck).

As shown in FIG. 4, user interface 402 recommends a product (e.g., manufactured product 424r (e.g., aftershave)) based on the user-specific electronic recommendation 412. In the example of FIG. 4, the output or analysis of image(s) (e.g. image 202a) of hair density model (e.g., hair density model 108), e.g., user-specific electronic recommendation 412 and/or its related values (e.g., High Density) or related pixel data (e.g., 202ap1 and/or 202ap2), may be used to generate or identify recommendations for corresponding product(s). Such recommendations may include products such as shaving gel, new shaving razor(s), shaving blade(s), or the like to address the user-specific issue as detected within the pixel data by the hair density model (e.g., hair density model 108).

In the example of FIG. 4, user interface 402 renders or provides a recommended product (e.g., manufactured product 424r) as determined by hair density model (e.g., hair density model 108) and its related image analysis of image 202a and its pixel data and various features. In the example of FIG. 4, this is indicated and annotated (424p) on user interface 402.

User interface 402 may further include a selectable UI button 424s to allow the user (e.g., the user of image 202a) to select for purchase or shipment the corresponding product (e.g., manufactured product 424r). In some embodiments, selection of selectable UI button 424s may cause the recommended product(s) to be shipped to the user (e.g., user 202au) and/or may notify a third party that the user is interested in the product(s). For example, either user computing device 111c1 and/or imaging server(s) 102 may initiate, based on user-specific electronic recommendation 412, the manufactured product 424r (e.g., aftershave) for shipment to the user. In such embodiments, the product may be packaged and shipped to the user.

In various embodiments, graphical representation (e.g., image 202a), with graphical annotations (e.g., area of pixel data 202ap), textual annotations (e.g., text 202at), user-specific electronic recommendation 412 may be transmitted, via the computer network (e.g., from an imaging server 102 and/or one or more processors) to user computing device 111c1, for rendering on display screen 400. In other embodiments, no transmission to the imaging server of the user's specific image occurs, where the user-specific recommendation (and/or product specific recommendation) may instead be generated locally, by the hair density model (e.g., hair density model 108) executing and/or implemented on the user's mobile device (e.g., user computing device 111c1) and rendered, by a processor of the mobile device, on display screen 400 of the mobile device (e.g., user computing device 111c1).

In some embodiments, any one or more of graphical representations (e.g., image 202a), with graphical annotations (e.g., area of pixel data 202ap), textual annotations (e.g., text 202at), user-specific electronic recommendation 412, and/or product recommendation 422 may be rendered (e.g., rendered locally on display screen 400) in real-time or near-real time before, during, and/or after the user shaves their respective body or body area. In embodiments where the image is analyzed by imaging server(s) 102, the image may be transmitted and analyzed in real-time or near real-time by imaging server(s) 102.

In some embodiments, the user may provide a new image that may be transmitted to imaging server(s) 102 for updating, retraining, or reanalyzing by hair density model 108. In other embodiments, a new image that may be locally received on computing device 111c1 and analyzed, by hair density model 108, on the computing device 111c1.

In addition, as shown in the example of FIG. 4, the user may select selectable button 412i to for reanalyzing (e.g., either locally at computing device 111c1 or remotely at imaging server(s) 102) a new image. Selectable button 412i may cause user interface 402 to prompt the user to attach for analyzing a new image. Imaging server(s) 102 and/or a user computing device such as user computing device 111c1 may receive a new image of the user before, during, and/or after shaving/trimming all or a portion of the user's body or body area. The new image may be captured by the digital camera. The new image (e.g., just like image 202a) may comprise pixel data of the user's body or body area. The hair density model (e.g., hair density model 108), executing on the memory of the computing device (e.g., imaging server(s) 102), may analyze the new image captured by the digital camera to determine a new user-specific hair density value of the user's body or body area. The computing device (e.g., imaging server(s) 102) may generate, based on the new user-specific hair density value, a new user-specific electronic recommendation or comment regarding at least one feature identifiable within the pixel data of the new image. For example, the new user-specific electronic recommendation may include a new graphical representation including graphics and/or text (e.g., showing a new user-specific hair density value, e.g., Average Density). The new user-specific electronic recommendation may include additional recommendations, e.g., that the user has an average hair density, as detected with the pixel data of the new image, and should wash their body or body area with warm water before shaving to lessen skin irritation. A comment may include that the user has corrected the at least one feature identifiable within the pixel data (e.g., the user's hair in the area represented by the pixel data appears wet, the user has little or no skin irritation after shaving/trimming, etc.).

In some embodiments, the new user-specific recommendation or comment may be transmitted via the computer network to the user computing device of the user for rendering on the display screen of the user computing device. In other embodiments, no transmission to the imaging server of the user's new image occurs, where the new user-specific recommendation (and/or product specific recommendation) may instead be generated locally, by the hair density model (e.g., hair density model 108) executing and/or implemented on the user's mobile device (e.g., user computing device 111c1) and rendered, by a processor of the mobile device, on a display screen of the mobile device (e.g., user computing device 111c1).

ASPECTS OF THE DISCLOSURE

The following aspects are provided as examples in accordance with the disclosure herein and are not intended to limit the scope of the disclosure.

1. A digital imaging method of analyzing pixel data of an image of a user's body for determining a hair density value of the user's hair, the digital imaging method comprising the steps of: (a) aggregating, at one or more processors communicatively coupled to one or more memories, a plurality of training images of a plurality of users, each of the training images comprising pixel data of a respective user's body or body area; (b) training, by the one or more processors with the pixel data of the plurality of training images, a hair density model comprising a hair density scale and operable to output, across a range of the hair density scale, hair density values associated with a degree of hair density ranging from least dense to most dense; (c) receiving, at the one or more processors, at least one image of a user, the at least one image captured by a digital camera, and the at least one image comprising pixel data of the user's body or body area; (d) analyzing, by the hair density model executing on the one or more processors, the at least one image captured by the digital camera to determine a user-specific hair density value of the user's hair; and (e) generating, by the one or more processors based on the user-specific hair density value, at least one product recommendation for a manufactured product, the manufactured product designed to address at least one feature identifiable within the pixel data of the user's body or body area.

2. The digital imaging method of aspect 1, further comprising the steps of: rendering, on a display screen of a user computing device, the at least one product recommendation.

3. The digital imaging method of aspect 2, wherein the at least one product recommendation is displayed on a display screen of the user computing device with a graphical representation of the user's body or body area as annotated with one or more graphics or textual renderings corresponding to the user-specific hair density value.

4. The digital imaging method of aspect 3, wherein the at least one product recommendation is displayed on a display screen of the user computing device with instructions for treating, with the manufactured product, the at least one feature identifiable within the pixel data of the user's body or body area.

5. The digital imaging method of aspect 2, wherein the at least one product recommendation is displayed on a display screen of the user computing device with an augmented graphical representation of the user's body or body area including at least one recommended hair style corresponding to the user-specific hair density value.

6. The digital imaging method of any one of aspects 1-5, further comprising the steps of: initiating, based on the at least one product recommendation, the manufactured product for shipment to the user.

7. The digital imaging method of any one of aspects 1-6, further comprising the steps of: selecting, by the one or more processors based upon the user-specific hair density value, a recommended behavior from at least two available behaviors, and wherein the at least one product recommendation includes the recommended behavior.

8. The digital imaging method of any one of aspects 1-7, wherein the hair density model is an artificial intelligence (AI) based model trained with at least one AI algorithm.

9. The digital imaging method of any one of aspects 1-8, wherein the at least one image of the user is captured by the digital camera in conjunction with a hair removal event associated with at least a portion of the user's body or body area represented in the at least one image of the user.

10. The digital imaging method of any one of aspects 1-9, wherein the hair density model is further trained, by the one or more processors with the pixel data of the plurality of training images, to output one or more location identifiers indicating one or more corresponding body area locations of respective users, and wherein the hair density model, executing on the one or more processors and analyzing the at least one image of the user, determines a location identifier indicating a body area location of the user's body or body area.

11. The digital imaging method of aspect 10, wherein the body area location comprises at least one of user's face, the user's cheek, the user's neck, the user's jaw, the user's head, the user's groin, the user's underarm, the user's chest, the user's back, the user's leg, the user's arm, or the user's bikini area.

12. The digital imaging method of any one of aspects 1-11, wherein the one or more processors comprises at least one of a server or a cloud-based computing platform, and the server or the cloud-based computing platform receives the plurality of training images of the plurality of users via a computer network, and wherein the server or the cloud-based computing platform trains the hair density model with the pixel data of the plurality of training images.

13. The digital imaging method of aspect 12, wherein the server or the cloud-based computing platform receives the at least one image comprising the pixel data of the user's body or body area, and wherein the server or a cloud-based computing platform executes the hair density model and generates, based on output of the hair density model, the at least one product recommendation and transmits, via the computer network, the at least one product recommendation to the user computing device for rendering on the display screen of the user computing device.

14. The digital imaging method of aspect 2, wherein the user computing device comprises at least one of a mobile device, a tablet, a handheld device, a desktop device, a home assistant device, a personal assistant device, or a retail computing device.

15. The digital imaging method of aspect 14, wherein the user computing device receives the at least one image comprising the pixel data of the user's body or body area, and wherein the user computing device executes the hair density model and generates, based on output of the hair density model, the at least one product recommendation and renders the at least one product recommendation on the display screen of the user computing device.

16. The digital imaging method of aspect 14, wherein the user computing device is the retail computing device, and the method further comprising the steps of: responsive to rendering the at least one product recommendation, dispensing, at the retail computing device, the manufactured product for retrieval by the user.

17. The digital imaging method of any one of aspects 1-16, wherein training, by the one or more processors with the pixel data of the plurality of training images, the hair density model comprises training the hair density model to detect an amount of hair follicles on the user's skin to determine the user-specific hair density value of the user's hair.

18. The digital imaging method of any one of aspects 1-17, further comprising: receiving, at the one or more processors, a new image of the user, the new image captured by the digital camera, and the new image comprising pixel data of the user's body or body area; analyzing, by the hair density model executing on the one or more processors, the new image captured by the digital camera to determine a new user-specific hair density value of the user's hair; generating, based on the new user-specific hair density value, a new product recommendation for a new manufactured product, the new manufactured product designed to address at least one feature identifiable within the pixel data of the user's body or body area; and rendering, on a display screen of a user computing device of the user, the new product recommendation.

19. The digital imaging method of aspect 18, wherein a composite hair density value is generated based on a comparison between the new user-specific hair density value and the user-specific hair density value, wherein the new product recommendation is further based on the composite hair density value, and wherein the composite hair density value is rendered on the display screen of the user computing device.

20. The digital imaging method of aspect 19, wherein the new image comprises pixel data of a different portion of the user's body or body area relative to the at least one image.

21. The digital imaging method of aspect 18, wherein the new image of the user comprises pixel data indicative of a hair removal associated with at least a portion of the user's body or body area represented in the at least one image of the user, and wherein the new manufactured product is designed to address the hair removal associated with at least a portion of the user's body or body area.

22. The digital imaging method of any one of aspects 1-21, wherein the at least one image comprises a plurality of images, and the plurality of images are collected using a digital video camera.

23. A digital imaging system configured to analyze pixel data of an image of a user's body for determining a hair density value of the user's hair, the digital imaging system comprising: an imaging server comprising a server processor and a server memory; an imaging application (app) configured to execute on a user computing device comprising a device processor and a device memory, and the imaging app communicatively coupled to the imaging server; and a hair density model trained with pixel data of a plurality of training images of a plurality of users and operable to output, across a range of the hair density scale, hair density values associated with a degree of hair density ranging from least dense to most dense, wherein the hair density model is configured to execute on the server processor or the device processor to cause the server processor or the device processor to: receive at least one image of a user, the at least one image captured by a digital camera, and the at least one image comprising pixel data of the user's body or body area, analyze, by the hair density model, the at least one image captured by the digital camera to determine a user-specific hair density value of the user's hair, generate, based on the user-specific hair density value, at least one product recommendation for a manufactured product, the manufactured product designed to address at least one feature identifiable within the pixel data of the user's body or body area, and render, on a display screen of the user computing device of the user, the at least one product recommendation.

24. A tangible, non-transitory computer-readable medium storing instructions for analyzing pixel data of an image of a user's body for determining a hair density value of the user's hair, that when executed by one or more processors cause the one or more processors to: (a) aggregate, at one or more processors communicatively coupled to one or more memories, a plurality of training images of a plurality of users, each of the training images comprising pixel data of a respective user's body or body area; (b) train, by the one or more processors with the pixel data of the plurality of training images, a hair density model comprising a hair density scale and operable to output, across a range of the hair density scale, hair density values associated with a degree of hair density ranging from least dense to most dense; (c) receive, at the one or more processors, at least one image of a user, the at least one image captured by a digital camera, and the at least one image comprising pixel data of the user's body or body area; (d) analyze, by the hair density model executing on the one or more processors, the at least one image captured by the digital camera to determine a user-specific hair density value of the user's hair; (e) generate, by the one or more processors based on the user-specific hair density value, at least one product recommendation for a manufactured product, the manufactured product designed to address at least one feature identifiable within the pixel data of the user's body or body area; and (f) render, on a display screen of a user computing device, the product recommendation.

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although user operations of one or more methods are illustrated and described as separate operations, one or more of the user operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A digital imaging method of analyzing pixel data of at least one image of a user's body for determining a user-specific hair density value of the user's hair, the digital imaging method comprising the steps of:
   a. aggregating, at one or more processors communicatively coupled to one or more memories, a plurality of training images of a plurality of users, each of the training images comprising pixel data of a respective user's body or body area;
   b. training, by the one or more processors with the pixel data of the plurality of training images, a hair density model comprising a hair density scale and operable to output, across a range of the hair density scale, (i) hair density values associated with a degree of hair density ranging from least dense to most dense and (ii) one or more location identifiers indicating one or more corresponding body area locations of respective users;
   c. receiving, at the one or more processors, at least one image of a user, the at least one image captured by a digital camera, and the at least one image comprising pixel data of the user's body or body area;
   d. analyzing, by the hair density model executing on the one or more processors, the at least one image captured by the digital camera without additional input from the user to determine (i) a user-specific hair density value of the user's hair and (ii) a location identifier indicating a body area location of the user's body or body area; and
   e. generating, by the one or more processors based on the user-specific hair density value and the location identifier, at least one product recommendation for a manufactured product, the manufactured product designed to address at least one feature identifiable within the pixel data of the user's body or body area.

2. The digital imaging method of claim 1, further comprising the steps of:
rendering, on a display screen of a user computing device, the at least one product recommendation.

3. The digital imaging method of claim 2, wherein the at least one product recommendation is displayed on a display screen of the user computing device with a graphical representation of the user's body or body area as annotated with one or more graphics or textual renderings corresponding to the user-specific hair density value.

4. The digital imaging method of claim 3, wherein the at least one product recommendation is displayed on a display screen of the user computing device with instructions for treating, with the manufactured product, the at least one feature identifiable within the pixel data of the user's body or body area.

5. The digital imaging method of claim 2, wherein the at least one product recommendation is displayed on a display screen of the user computing device with an augmented graphical representation of the user's body or body area including at least one recommended hair style corresponding to the user-specific hair density value.

6. The digital imaging method of claim 1, further comprising the steps of:
initiating, based on the at least one product recommendation, the manufactured product for shipment to the user.

7. The digital imaging method of claim 1, further comprising the steps of:
selecting, by the one or more processors based upon the user-specific hair density value, a recommended behavior from at least two available behaviors, and
wherein the at least one product recommendation includes the recommended behavior.

8. The digital imaging method of claim 1, wherein the hair density model is an artificial intelligence (AI) based model trained with at least one AI algorithm.

9. The digital imaging method of claim 1,
wherein the at least one image of the user is captured by the digital camera in conjunction with a hair removal event associated with at least a portion of the user's body or body area represented in the at least one image of the user.

10. The digital imaging method of claim 1, wherein the body area location comprises at least one of the user's face, the user's cheek, the user's neck, the user's jaw, the user's head, the user's groin, the user's underarm, the user's chest, the user's back, the user's leg, the user's arm, or the user's bikini area.

11. The digital imaging method of claim 1, wherein the one or more processors comprises at least one of a server or a cloud-based computing platform, and the server or the cloud-based computing platform receives the plurality of training images of the plurality of users via a computer network, and wherein the server or the cloud-based computing platform trains the hair density model with the pixel data of the plurality of training images.

12. The digital imaging method of claim 11, wherein the server or the cloud-based computing platform receives the at least one image comprising the pixel data of the user's body or body area, and wherein the server or a cloud-based computing platform executes the hair density model and generates, based on output of the hair density model, the at least one product recommendation and transmits, via the computer network, the at least one product recommendation to the user computing device for rendering on the display screen of the user computing device.

13. The digital imaging method of claim 2, wherein the user computing device comprises at least one of a mobile device, a tablet, a handheld device, a desktop device, a home assistant device, a personal assistant device, or a retail computing device.

14. The digital imaging method of claim 13, wherein the user computing device receives the at least one image comprising the pixel data of the user's body or body area, and wherein the user computing device executes the hair density model and generates, based on output of the hair density model, the at least one product recommendation and renders the at least one product recommendation on the display screen of the user computing device.

15. The digital imaging method of claim 13, wherein the user computing device is the retail computing device, and the method further comprising the steps of:
responsive to rendering the at least one product recommendation, dispensing, at the retail computing device, the manufactured product for retrieval by the user.

16. The digital imaging method of claim 1, wherein training, by the one or more processors with the pixel data of the plurality of training images, the hair density model comprises training the hair density model to detect an amount of hair follicles on the user's skin to determine the user-specific hair density value of the user's hair.

17. The digital imaging method of claim 1, further comprising:
receiving, at the one or more processors, a new image of the user, the new image captured by the digital camera, and the new image comprising pixel data of the user's body or body area;
analyzing, by the hair density model executing on the one or more processors, the new image captured by the digital camera to determine a new user-specific hair density value of the user's hair;
generating, based on the new user-specific hair density value, a new product recommendation for a new manufactured product, the new manufactured product designed to address at least one feature identifiable within the pixel data of the user's body or body area; and
rendering, on a display screen of a user computing device of the user, the new product recommendation.

18. The digital imaging method of claim 17, wherein a composite hair density value is generated based on a comparison between the new user-specific hair density value and the user-specific hair density value, wherein the new product recommendation is further based on the composite hair density value, and wherein the composite hair density value is rendered on the display screen of the user computing device.

19. The digital imaging method of claim 18, wherein the new image comprises pixel data of a different portion of the user's body or body area relative to the at least one image.

20. The digital imaging method of claim 17,
wherein the new image of the user comprises pixel data indicative of a hair removal event associated with at least a portion of the user's body or body area represented in the at least one image of the user, and
wherein the new manufactured product is designed to address the hair removal event associated with the at least the portion of the user's body or body area.

21. The digital imaging method of claim 1, wherein the at least one image comprises a plurality of images, and the plurality of images are collected using a digital video camera.

22. A digital imaging system configured to analyze pixel data of an image of a user's body for determining a hair density value of the user's hair, the digital imaging system comprising:
- an imaging server comprising a server processor and a server memory;
- an imaging application (app) configured to execute on a user computing device comprising a device processor and a device memory, and the imaging app communicatively coupled to the imaging server; and
- a hair density model trained with pixel data of a plurality of training images of a plurality of users and operable to output, across a range of the hair density scale, (i) hair density values associated with a degree of hair density ranging from least dense to most dense, and (ii) one or more location identifiers indicating one or more corresponding body area locations of respective users,
- wherein the hair density model is configured to execute on the server processor or the device processor to cause the server processor or the device processor to:
  - receive at least one image of a user, the at least one image captured by a digital camera, and the at least one image comprising pixel data of the user's body or body area,
  - analyze, by the hair density model, the at least one image captured by the digital camera without additional input from the user to determine (i) a user-specific hair density value of the user's hair and (ii) a location identifier indicating a body area location of the user's body or body area,
  - generate, based on the user-specific hair density value and the location identifier, at least one product recommendation for a manufactured product, the manufactured product designed to address at least one feature identifiable within the pixel data of the user's body or body area, and
  - render, on a display screen of the user computing device of the user, the at least one product recommendation.

23. A tangible, non-transitory computer-readable medium storing instructions for analyzing pixel data of an image of a user's body for determining a hair density value of the user's hair, that when executed by one or more processors cause the one or more processors to:
- a. aggregate, at one or more processors communicatively coupled to one or more memories, a plurality of training images of a plurality of users, each of the training images comprising pixel data of a respective user's body or body area;
- b. train, by the one or more processors with the pixel data of the plurality of training images, a hair density model comprising a hair density scale and operable to output, across a range of the hair density scale, (i) hair density values associated with a degree of hair density ranging from least dense to most dense, and (ii) one or more location identifiers indicating one or more corresponding body area locations of respective users;
- c. receive, at the one or more processors, at least one image of a user, the at least one image captured by a digital camera, and the at least one image comprising pixel data of the user's body or body area;
- d. analyze, by the hair density model executing on the one or more processors, the at least one image captured by the digital camera without additional input from the user to determine (i) a user-specific hair density value of the user's hair and (ii) a location identifier indicating a body area location of the user's body or body area;
- e. generate, by the one or more processors based on the user-specific hair density value and the location identifier, at least one product recommendation for a manufactured product, the manufactured product designed to address at least one feature identifiable within the pixel data of the user's body or body area; and
- f. render, on a display screen of a user computing device, the product recommendation.

* * * * *